Dec. 27, 1932.    B. STOCKFLETH    1,892,180
METHOD OF MAKING BEARING SLEEVES
Filed Jan. 2, 1931
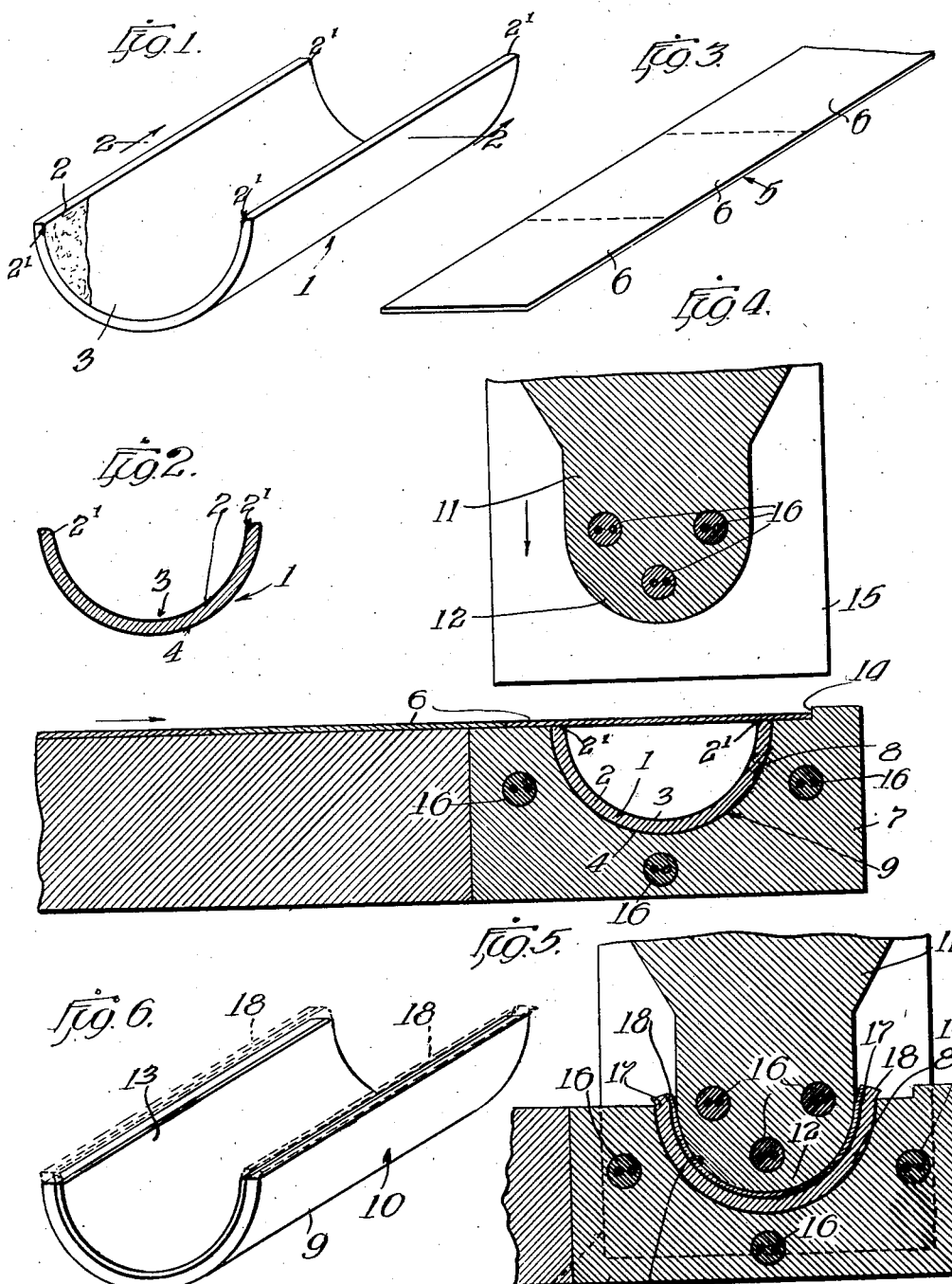

Patented Dec. 27, 1932

1,892,180

UNITED STATES PATENT OFFICE

BERGER STOCKFLETH, OF NILES, MICHIGAN, ASSIGNOR, BY MESNE ASSIGNMENTS, TO THE CLEVELAND GRAPHITE BRONZE COMPANY, OF CLEVELAND, OHIO, A CORPORATION OF OHIO

METHOD OF MAKING BEARING SLEEVES

Application filed January 2, 1931. Serial No. 506,197.

This invention relates to improvements in methods of making bi-metal or lined bearing sleeves and has special reference to the rapid production of half-cylindrical sleeves of the kind that requires a pair of two of them to make a complete cylindrical bearing sleeve.

Such sleeves usually consist of a backing member of a relatively harder metal, such as steel, and a relatively softer bearing metal, such as Babbitt metal, and the object of this invention is to reduce the cost of such sleeves by providing a method by which they can be made more quickly and cheaply, to make the bonding of the bearing metal lining to the backing more certain and generally to produce a better bearing sleeve.

In accordance with this invention, the backing shells are preformed roughly to the shape and dimensions of the backing in the finished sleeve, preferably, out of a suitable sheet metal such as steel. The back is then prepared for the reception of the lining, preferably by being roughened at least on its inner surface by some suitable method, as being deeply etched in a suitable acid bath, and it is next coated with a suitable bonding metal, such as tin.

The lining material is prepared in sheet form of a suitable thickness, and is preferably prepared in strips substantially equal in width to the length of the backs to which the lining material is to be applied.

The strip of bearing metal may then be cut into pieces each of suitable size for making a lining of a half-cylindrical bearing shell and fed, one by one, in succession into a suitable press for completing the sleeve.

The backing shells are heated to a temperature to melt the bonding metal with which they are coated and then placed in a suitable press with the hollow side up, or they may be placed in the press as they are taken hot out of the tin bath. Then one of the flat pieces of the lining metal is placed in position in the press above the back and a co-operating plunger is forced down, carrying the lining sheet down into the lower die and pressing it into firm and intimate contact with the inner concave surface of the back and into contact with the molten bonding metal with which the back is covered.

The bearing metal lining thus held in the press absorbs heat from the back but not fast enough to chill the bonding metal before the lining is firmly bonded to the back. It does absorb heat enough so that upon the application of a greater forming pressure, it is malleable enough to be thinned to some extent and elongated circumferentially to some extent in completing the sleeve, that is, forming it to dimensions within the allowable tolerances.

The invention will be more readily understood from the following description taken in conjunction with the appended claims and the accompanying drawing forming part of this specification and in which:—

Fig. 1 is a perspective view of a preformed sleeve back or backing shell;

Fig. 2 is a cross-section on the line 2—2 of Fig. 1;

Fig. 3 is a perspective view of a suitable strip of the bearing metal;

Fig. 4 is a fragmentary view of a pair of suitable forming dies before being closed to form a sleeve;

Fig. 5 is a view similar to Fig. 4 showing the dies closed; and

Fig. 6 is a perspective view of a finished sleeve, the extruded edge portions being shown in dotted lines.

In said drawing, 1 illustrates a preformed, substantially, half-cylindrical backing shell. Preferably, the shell is roughened at least on its inner concave surface 2 by some suitable means, such as etching with a suitable acid, and the shell 1 is coated at least on its inner surface with a suitable bonding metal, as indicated at 3. Preferably, the backing is also coated on its outer surface with the tin, as indicated at 4.

The lining metal is prepared in sheet form and in a long strip 5. This strip is preferably of a width equal to the length of the shell 1, and is at some time cut into pieces 6, each of a length to form a lining for one backing shell. Obviously, the strip can be cut into the pieces 6 and these fed individually into a suitable forming press, or the strip 5 might be fed into the press and the pieces 6 to be formed severed from the strip but, in either case, one of the pieces 6 is placed in a press and is formed into position into a backing shell by the press. This operation is illustrated in Figs. 4 and 5.

Only the essential die members of the press are shown. These consist of a lower die member 7 provided with a substantially semi-cylindrical die opening 8, the inner concave surface of which is of the exact form and dimensions desired for the outer surface 9 of the finished sleeve 10. The upper co-operating die member is a plunger 11 and its lower co-operating end 12 is of the shape and dimensions desired for the inner surface 13 of the finished bearing sleeve 10. The die parts being separated, as shown in Fig. 4, one of the backing shells 1 is placed down in the opening 8 of the lower die member, the shell being first heated slightly above the melting point of the bonding metal so that the bonding metal forms a liquid film on the upper or concave surface 2 of the backing shell. At substantially the same time, or immediately thereafter, a piece 6 of the bearing metal is placed in position on the lower die member centrally above the opening 8, a stop 14 being provided at one side against which one edge of the piece 6 may be placed for assisting in centralizing the piece in relation to the opening 8.

The piece 6 of bearing metal may be pre-heated to a temperature approximately, or preferably slightly below, the melting point of the bonding metal before it is placed in the press. Such pre-heating allows the bearing metal piece to be readily formed into position and assists in the bonding of the metals of the sleeve.

As shown at 2', the inner edges of the longitudinal edge portions of the rough back 1 are preferably rounded off to allow the bearing metal piece to slide down freely over these edges without catching or scraping in the forming operation.

The upper die member 11 is provided with parts 15 at its ends adapted to close the ends of the die space when the plunger is lowered to operating position.

Then the press is operated to force the plunger 11 down onto the piece 6 and form it down into the opening 8 in the lower die member and into intimate and substantially complete and perfect contact with the tinned inner surface 2 of the backing shell.

At this point, the press may dwell for a brief time to permit the lining member 6 to absorb heat from the backing shell and become thoroughly bonded to the back through the medium of the bonding metal, the pressure with which the lining is held in contact with the tinned back assisting in this bonding and in the amalgamation of the tin with the bearing metal.

The formation of the sleeve is then completed by the further application of pressure, while the bearing metal is heated sufficient to be malleable, the pressure applied being sufficient to compress and densify the metals of the sleeve, thus thinning out the metals and even causing them to be elongated circumferentially.

Preferably, the die members are maintained at a temperature substantially or slightly less than the melting point of the bonding metal by any suitable means, such as electric heating elements 16 arranged in suitable pockets or openings in the members.

It will be seen that spaces 17 are left at each side between the die members at the longitudinal edges of the sleeve and through which the edges of the sleeve can be extruded more or less depending on the amount of excess metal there is present.

This elongation of the sleeve assists in the accuracy of the finished product as the slight movement especially of the backing metal, under the tremendous pressure employed, assists in "ironing out" or smoothing out any irregularities which may exist therein and results in a sleeve having smooth, accurate, correct surfaces.

The extruded edges are shown at 18 and to finish the sleeve, it is only necessary to remove these extruded portions by any suitable means, leaving the finished sleeve 10 substantially a half-cylinder.

As many modifications of the invention will readily suggest themselves to one skilled in the art, I do not limit or confine the invention to the specific details of the several steps and their order herein illustrated and described except within the scope of the appended claims.

I claim:

1. The herein described method of making bi-metal bearing sleeves which consists in preforming a backing shell substantially to the form and dimensions of the back in the finished sleeve, coating at least the inner surface of the shell with a suitable bonding metal such as tin, heating the coated shell to a temperature sufficient to cause the bonding metal to form a molten film on the inner surface of the shell, preparing the lining metal face of the shell, preparing the lining metal in sheet form, with suitable die members pressing a piece of the sheet lining material into the inner concave surface of the shell and into intimate and firm contact with the molten film of bonding metal thereon, and holding the lining pressed against the shell for an interval to permit the lining to become heated to a point of malleability, and then subjecting the sleeve to sufficient pressure to cause a thinning of the sleeve and its elongation circumferentially.

2. The herein described method of making bi-metal bearing sleeves which consists in preforming a substantially half-cylindrical backing shell to approximately the form and dimensions of the backing in the finished sleeve, coating the shell at least on its inner surface with a suitable bonding metal such as tin, arranging the shell with its concave side uppermost in a suitable concave die member, the shell being hot enough so that the bonding metal forms a molten film on its inner surface, preforming the lining metal into sheet form, arranging a suitable piece of the lining metal centrally above and out of contact with the shell, forming the lining into half-cylindrical shape and forcing it down into intimate contact with the inner coated surface of the shell by a suitably formed co-operating die member, holding the lining member pressed against the shell until bonded thereto and by an increase of pressure thinning the sleeve and causing the metals of the sleeve to be elongated circumferentially as and for the purpose specified.

3. The herein described method of making bi-metal bearing sleeves which consists in preforming a backing shell substantially to the form and dimensions of the back in the finished sleeve, coating at least the inner surface of the shell with a suitable bonding metal such as tin, heating the coated shell to a temperature sufficient to cause the bonding metal to form a molten film on the inner surface of the shell, preparing the lining metal in sheet form, with suitable die members pressing a piece of the sheet lining material onto the inner concave surface of the shell and into intimate and firm contact with the molten film of bonding metal thereon and holding the lining pressed against the shell for an interval to permit the lining to become heated to a point of malleability, and then subjecting the sleeve to sufficient pressure to cause a thinning of the sleeve radially and some elongation of the metals thereof.

4. The herein described method of making bi-metal bearing sleeves which consists in preforming a substantially half-cylindrical backing shell to approximately the form and dimensions of the backing in the finished sleeve, coating the shell at least on its inner surface with a suitable bonding metal such as tin, arranging the shell with its concave side uppermost in a suitable concave die member, the shell being hot enough so that the bonding metal forms a molten film on its inner surface, preforming the lining metal into sheet form, arranging a suitable piece of the lining metal centrally above and out of contact with the shell, forming the lining into half-cylindrical shape and forcing it down into intimate contact with the inner coated surface of the shell by a suitably formed co-operating die member, holding the lining member pressed against the shell until bonded thereto and by an increase of pressure thinning the sleeve radially and causing the sleeve to be elongated in a direction substantially parallel to the co-operating die surfaces.

In testimony whereof, I have hereunto set my hand this second day of December, 1930.

BERGER STOCKFLETH.